3,463,643

LOW-TEMPERATURE IRRADIATION TREATMENT OF DEHYDRATED POTATOES

Donald S. Gardner, Scarborough, Ontario, Canada, and Clarence K. Wadsworth, Wellesley, Mass.; said Wadsworth assignor to the United States of America as represented by the Secretary of the Army
No Drawing. Filed Jan. 5, 1966, Ser. No. 518,795
Int. Cl. A23l 3/26, 1/12; A23b 7/03
U.S. Cl. 99—104      4 Claims

ABSTRACT OF THE DISCLOSURE

Dehydrated potatoes, having a moisture content of between 1–20% by weight of water, are subjected to ionizing radiation in the range of 1–10 mega rads in a temperature environment of at least below $-100°$ C.

---

This invention relates to a process for reducing the rehydration and cooking times of dehydrated potatoes whilst retaining their original flavour; it has particular relation to providing improved dehydrated diced and sliced potatoes which retain their original flavour and colour on cooking.

It is known to subject dehydrated potatoes to irradiation such as gamma rays, for the purpose of reducing the rehydration and cooking times, the moisture content of such dehydrated potatoes is conventionally between 1–20% by weight of water, but it has been found that such irradiation imparts undesirable properties to the dehydrated potatoes with resulting production of off-colour, flavour and/or loss of texture.

To illustrate the resulting deleterious effects, in particular off-flavour, dehydrated diced potatoes ⅜ x ⅜ x ⅜ were treated with ionising radiation obtained from a cobalt 60 source; for this experiment a radioactive cobalt 60 source was used which has a half life of 5.3 years and decays at the rate of approximately 1% per month. The levels of dosage used were $0.5 \times 10^6$ and $5.0 \times 10^6$ rads. The treated dices were then rehydrated by placing a 50 gram sample in a 1000 ml. of distilled water in a stainless steel saucepan. The lid was then placed on the saucepan and the water was brought to 200° F. The dices were then cooked and the colour, flavour, texture and rehydration ratios were recorded. The following table illustrates the effect of ionising radiation on the culinary characteristics of rehydrated diced potatoes:

TABLE 1

| Dosage (rads) | Flavour | Cooking time (mins.) |
|---|---|---|
| Control | Good | 12.5 |
| $0.5 \times 10^6$ | Fair | 8.5 |
| $5.0 \times 10^6$ | Poor | 3.5 |

It will be noted that while a reduction in cooking times were achieved by irradiation the flavour is affected adversely even at a level of $0.5 \times 10^6$ rads and at ten times this level the flavour was markedly impaired.

It has been found that such undesirable side effects may be substantially reduced or even eliminated according to this invention by irradiating dehydrated potatoes in an environment having a temperature below $-100°$ C.; the level of irradiation, which may be either gamma or beta rays, should lie between 1–10 mega rads, the rad being the unit of absorbed dose and is equivalent to 100 ergs per gram. It has been found that dehydrated potatoes irradiated under the conditions specified by this invention may be prepared for consumption within as little as two minutes boiling in water whilst retaining to a significant degree their original flavour and colour.

The invention will be best described and understood by comparing the effect on the property of flavour alone obtained by treating canned dehydrated diced potatoes prepared from one variety, viz. Cherokee (1.075–1.080) potatoes with different levels of irradiation at ambient temperatures and at a selected temperature below $-100°$ C.

Accordingly, canned dehydrated diced potatoes ⅜ x ⅜ x ⅜ were treated with doses of 4, 6 and 8 mega rads obtained from a cobalt 60 source in the medium of ambient air. Canned dehydrated diced potatoes from the same source were also subjected to the same irradiation levels but the treatment was carried out at $-170°$ C. to $-185°$ C., this being achieved by immersing the cans in liquid nitrogen.

The hydrated diced potatoes irradiated at ambient temperatures and at the temperature achieved by a surrounding environment of liquid nitrogen were then rehydrated and cooked along with a control by the following procedure:

A 50 gram sample of potatoes plus 500 ml. of distilled water were placed in a stainless steel saucepan. The lid was secured and the sample heated to and maintained at 200° F. A sample was withdrawn every 2 minutes and tested for texture until the potatoes were cooked and were then evaluated for flavour employing a conventional subjective technique. The cooking times with a subjective evaluation of flavour for the control and the potatoes irradiated at ambient temperatures is shown in Table 2.

TABLE 2

| Dose (mrad) | Flavour | Cooking time (mins). |
|---|---|---|
| Control | Excellent | 19.0 |
| 4 | Fair | 8.5 |
| 6 | Poor | 5.5 |
| 8 | do | 4.0 |

By contrast evaluation of the flavour achieved at various levels of irradiation on diced potatoes maintained at a temperature of $-185°$ C. is shown in Table 3.

TABLE 3

| Dose (mrad) | Flavour | Cooking time (mins). |
|---|---|---|
| Control | Excellent | 19.0 |
| 4 | Good | 7.0 |
| 6 | do | 4.0 |
| 8 | Fair | 2.5 |

It will be observed that there is an even greater reduction in cooking times as a result of irradiating the diced potatoes at a temperature of $-185°$ C. as compared with the same level of irradiation given at ambient temperatures. Furthermore, there is nowhere near the same alteration in flavour consequent on treatment at the low temperature level.

A further comparison illustrating the effect of irradiation at a temperature below $-100°$ C. was made using sliced ½ x ½ x ⁵⁄₃₂ potatoes which were obtained from the same variety, viz. Cherokee (1.075–1.080). One group of canned dehydrated sliced potatoes were treated at ambient temperatures with irradiation levels of 4 and 6 mega rads and the other group treated by immersing the cans in liquid nitrogen with irradiation levels of 4, 6 and 8 mega rads. Both groups were then rehydrated and cooked along with a control under the procedure outlined above. A subjective evaluation of flavour was made of the group treated at ambient temperatures as shown in Table 4.

TABLE 4

| Dose (mrad) | Flavour | Cooking time (mins). |
|---|---|---|
| Control | Excellent | 17.0 |
| 4 | Fair | 5.0 |
| 6 | Poor | 3.5 |

The other group irradiated at low temperature was also rehydrated with a subjective flavour evaluation as illustrated in Table 5.

TABLE 5

| Dose (mrad) | Flavour | Cooking time (mins). |
|---|---|---|
| Control | Excellent | 17.0 |
| 4 | Good | 5.0 |
| 6 | do | 3.5 |
| 8 | Fair | 2.0 |

It will be noted that even with the dosage of 8 mega rads the flavour is fair and the resulting product is palatable. Even with a dosage at a level of 10 mega rads irradiation given at the requisite low temperature, an improvement in flavour was found over much lower dosages of irradiation given at ambient temperatures.

The precise reason for the improvement in such culinary characteristics may be due to the retardation of free radical formation, the formation of which is known to contribute in part to the off-flavour development. This surmise is supported by the absence of interaction of sulphites shown by analysis.

While the examples and comparisons between the dehydrated potatoes irradiated at ambient and at low temperatures has been made with respect to flavour, other culinary characteristics such as colour and texture are also improved when the irradiation takes place at the low temperature levels, thus irradiation at the 2 mega rad level at ambient temperatures gave slices which were light yellow with dark orange centres; by contrast with irradiation at 4 mega rads slices held in liquid nitrogen were acceptable.

While certain embodiments have been illustrated and described for the purpose of disclosure, it will be understood that the invention is not limited thereto, but contemplates such modifications and other embodiments as may be utilized without departing from the invention.

We claim:
1. A method of reducing the rehydration times of dehydrated potatoes which comprises the steps of immersing said potatoes in a temperature environment of at least below −100° C. and then irradiating said potatoes in said environment with a source of ionizing radiation in the range of 1–10 mega rads.

2. A method according to claim 1 wherein said environment is obtained by immersing said potatoes in liquid nitrogen.

3. A method according to claim 1 wherein said potatoes are diced.

4. A method according to claim 1 wherein said potatoes are sliced.

References Cited

UNITED STATES PATENTS

| 2,973,271 | 2/1961 | Baldwin et al. | 99—217 X |
| 3,025,171 | 3/1962 | Schroeder | 99—100 X |

OTHER REFERENCES

Hendel et al.: Treatment of Potatoes With Gamma Rays: Effects of Delay Between Harvest and Irradiation, Food Technology, April 1961 (pages 218—219).

A. LOUIS MONACELL, Primary Examiner

D. M. NAFF, Assistant Examiner

U.S. Cl. X.R.

99—100, 204, 207, 217